United States Patent
Kimura et al.

(10) Patent No.: US 6,265,800 B1
(45) Date of Patent: Jul. 24, 2001

(54) DISKETTE INCORPORATING PERMANENT MAGNET GENERATOR WITH REDUCED COGGING TORQUE AND PERMANENT MAGNET GENERATOR FOR USE IN DISKETTE

(75) Inventors: Fumio Kimura, Gyoda; Masahiro Masuzawa, Fukaya; Toshiko Takahashi, Fukaya; Masahiro Mita, Fukaya, all of (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 09/448,828

(22) Filed: Nov. 24, 1999

(30) Foreign Application Priority Data

Nov. 27, 1998 (JP) .................................. 10-336672

(51) Int. Cl.⁷ ............................ H02K 21/00; H02K 1/00; H02K 1/12; G11B 5/76
(52) U.S. Cl. .......................... 310/152; 310/185; 310/187; 310/193; 310/216; 310/259; 360/137
(58) Field of Search ............................ 360/137; 310/152, 310/156, 254, 259, 185, 186, 187, 193, 216

(56) References Cited

U.S. PATENT DOCUMENTS 2,711,008 * 6/1955 Smith ................................. 310/216
3,633,055 * 1/1972 Maier ................................. 310/156
4,001,887 * 1/1977 Platt et al. .............................. 360/90
4,392,073 * 7/1983 Rosenberry, Jr. ..................... 310/216
4,672,253 * 6/1987 Tajima et al. ......................... 310/269
5,041,924 * 8/1991 Blackborow et al. ................. 360/69
5,159,182    10/1992 Eisele ................................. 235/492
5,880,551 * 3/1999 Prudham ............................. 310/254

FOREIGN PATENT DOCUMENTS 7-500238  1/1995 (JP) ............................... H02K/21/14
7-86912   9/1995 (JP) ............................... G06K/19/00

* cited by examiner

Primary Examiner—Nestor Ramirez
Assistant Examiner—Dang Dinh Le
(74) Attorney, Agent, or Firm—Sughrue, Mion, Zinn, Macpeak & Seas, PLLC (57) ABSTRACT

A permanent magnet generator is so thin as to be incorporated in a 3.5" diskette. The generator having so low cogging torque that can be rotated smoothly even by a low torque driving source as a 3.5" FDD to generate stable output is disclosed. It has stator magnetic poles facing via a magnetic gap an outer circumferential surface of the stator permanent magnet having a plurality of magnetic poles on it. One to six of the stator magnetic poles are removed and instead of the removed magnetic poles provided is a soft magnetic piece to face the rotor magnetic poles. Grooves are preferably provided on the soft magnetic piece, facing the rotor magnetic poles. A notch is provided on the permanent magnet generator to avoid interference with an input/output terminal and/or a card contact terminal of the diskette for inserting a memory card.

4 Claims, 6 Drawing Sheets

DISKETTE INCORPORATING PERMANENT MAGNET GENERATOR WITH REDUCED COGGING TORQUE AND PERMANENT MAGNET GENERATOR FOR USE IN DISKETTE

FIELD OF THE INVENTION

The present invention relates generally to a diskette incorporating a permanent magnet generator, and more particularly to a diskette incorporating a permanent magnet generator, and a permanent magnet generator that is incorporated in a diskette used by inserting into a floppy disk drive, and when a memory is installed in the diskette, serves as a power source for the memory to input and output data in the memory.

DESCRIPTION OF THE RELATED ART

Medical information, such as personal medical checkup results, is stored in an IC card, from which medical institutions can retrieve such information for use in the treatment of the patient, and can store the contents of his case records in the card. Plans are also now under way to use IC cards as electronic cash. Under the plans, data on a customer's bank account, password, and his bank balance, if necessary, are stored in an IC card, by means of which payment is made on-line every time the customer buys a product.

It has been proposed that an enormous amount of video information handled by a digital camera should be stored in a flash memory that has a capacity as large as a couple of megabytes to 10 megabytes. A flash memory in which the video information is taken by a digital camera can be connected to a personal computer for subsequent video processing. The use of a flash memory to record the video information taken by a digital camera may eliminate an additional external memory unit, such as MOs.

The widespread use of IC cards or flash memories, as discussed above, has been deterred by the need for special input/output (I/O) devices dedicated for such media. Since most commonly used I/O devices for personal computers are floppy disk drives, particularly 3.5" floppy disk drives, the use of 3.5" floppy disks as an I/O device for IC cards and flash memories could spur their proliferation. In fact, adapters that can be inserted or incorporated in 3.5" floppy disk drives have already been proposed. A conventional type of 3.5" floppy disk drive has a magnetic head to read and write information from and into a 3.5" diskette and a drive shaft to cause the diskette to rotate at 300 rpm, but it has no power feeding terminals. In diskette-shaped adapters, as discussed above, a button battery is incorporated as a power source for the built-in CPU. A battery, which depletes as it is used, has to be replaced with a new one every four to five months at the longest. Introduction of a 3.5" floppy disk in which a generator is incorporated and driven by the rotation of the drive shaft of the 3.5" floppy disk drive would prove very useful, giving momentum to the proliferation of IC cards and similar media. In fact, the concept of incorporating a generator in a 3.5" diskette has already been proposed in Published Examined Japanese Patent Application No. Hei-7(1995)-86912 and Tokuhyo Hei-7(1995)-500238, the published Japanese translation of PCT international publication for patent application.

Published Examined Japanese Patent Application No. Hei-7(1995)-86912 discloses that a generator is incorporated in a 3.5" diskette, and that the generator has a rotor, a stator and a regulator, but its detailed construction is not disclosed. Tokuhyo Hei-7(1995)-500238 discloses a generator incorporated in a 3.5" diskette having a permanent magnet that rotates with a hub, which is caused to rotate by the drive shaft of a floppy disk drive. This permanent magnet is of a cylindrical shape, magnetized in the axial direction so that multiple magnetic poles are provided on the end face of the cylinder. The magnetic poles of a stator yoke are disposed in such a manner as to sandwich the cylindrical permanent magnet, and a stator coil is provided between the stator yokes on both sides of the cylindrical permanent magnet. Another example is also disclosed in which magnetic poles are provided on the circumferential surface of the cylindrical permanent magnet. In this example, the magnetic poles of the stator yoke are of a claw pole shape.

In this way, these documents state a permanent magnet type generator incorporated in a 3.5" diskette, but it is unknown how much output can be produced with such a generator because they do not disclose the material of permanent magnet suitable for use in such a generator, and the detailed construction of the rotor and stator.

Now, let us consider a permanent magnet generator of a size that can be incorporate in a 3.5" floppy disk, as disclosed in Tokuhyo Hei-7(1995)500238, where the cylindrical permanent magnet is magnetized in such a manner that multiple magnetic poles are provided on the end face of the cylinder. In this case, stator magnetic poles are disposed on both sides of the cylinder end face via small magnetic gaps. Since the allowable thickness of a generator in a diskette is 2.0 to 2.5 mm, the thickness of the permanent magnet is only 0.5 to 0.8 mm at most. Even when a material having a large coercive force is used for a magnet with such a short distance between magnetic poles, only a small magnetomotive force can be expected. Even if magnetomotive force is increased by increasing the thickness of the magnet, the allowable thickness of the stator magnetic poles is reduced, making it difficult to pass sufficient magnetic flux in them.

In a permanent magnet generator where magnetic poles are provided on the circumferential surface of the cylindrical permanent magnet and the claw pole type stator yoke is provided, as disclosed in Tokuhyo Hei-7(1995)-500238, the end yoke of both claw pole type magnetic poles is provided facing each other within the allowable thickness of 2.0 to 2.5 mm for the generator, and a stator winding is provided between the end yoke. Since a sufficient number of winding turns cannot be provided within the allowable length of no more than 1 mm for the stator winding. Thus, a generator having a low output voltage would result.

In order to realize a generator having as high an output as possible and as low distortion as possible, it is necessary to dispose rotor magnetic poles on the circumferential surface of the cylindrical permanent magnet at equal angular intervals, make the number of magnetic poles of the stator yokes equal to the number of magnetic poles of the rotor permanent magnet, and dispose the stator magnetic poles facing the permanent magnet magnetic poles via magnetic gaps of substantially the same size. With this construction of the permanent magnet generator, the attractive and repulsive forces between the stator magnetic poles and the rotor magnetic poles increase. That is, cogging torque increases. It results in uneven rotation when the generator is rotated by a low torque driving source, such as 3.5" floppy disk drive, probably to cause unstable output.

SUMMARY OF THE INVENTION

Accordingly, it is an object of this invention to provide a thin permanent magnet generator that can be incorporated in a diskette and can be rotated smoothly by a low torque driver, such as a 3.5" floppy disk drive, to supply a stable output.

It is another object of the invention to provide a diskette incorporating such a permanent magnet generator.

Still another object of the invention is to provide a diskette incorporating a permanent magnet generator of such a construction that an input/output terminal and/or a card contact terminal do not interfere the generator frame installed in an input/output diskette for a memory card, such as a magnetic card.

According to this invention, a diskette incorporating a permanent magnet generator comprises a diskette case and a permanent magnet generator incorporated in the diskette case. The permanent magnet generator comprises (1) a rotor having a ring-shaped permanent magnet that can rotate together with a hub; the permanent magnet having a plurality of rotor magnetic poles arranged on the circumferential surface; the magnetic poles having alternately different polarities in the circumferential direction, and (2) a stator having a plurality of magnetic pole teeth made of soft magnetic material. The rotor and the stator are formed into a flat disk shape as a whole, and the axial thickness of the stator magnetic poles is smaller than the axial thickness of the permanent magnet.

Each of the magnetic pole teeth has on one end thereof on a stator inner circumferential surface stator magnetic poles that can face via a magnetic gap at a time the rotor magnetic poles, except for at least one, provided on the rotor circumferential surface. And each magnetic pole tooth extends outward from the stator magnetic poles on the stator inner circumferential surface, having stator coil wound on it. The end opposite from the stator magnetic pole of each magnetic pole tooth and the ends opposite to the stator magnetic poles of the adjoining magnetic pole teeth are connected to each other by a back yoke made of soft magnetic material.

The stator has on the stator inner circumferential surface at least one soft magnetic piece which is positioned to enable to face the at least one rotor magnetic pole, that is, at the position of the removed at least one stator magnetic pole, and which circumferential width is not less than the width of one of the rotor magnetic poles.

The rotor permanent magnet preferably has a plurality of magnetic poles at substantially equal angular intervals on the circumferential surface. The number of the rotor magnetic poles preferably is 12 to 24 poles and more preferably 16 to 20 poles. Each of the magnetic poles, except for the removed at least one pole, of the stator preferably is disposed at substantially equal angular intervals on the stator inner circumferential surface in such a manner as to enable to face each of the rotor magnetic poles, except for the at least one rotor magnetic pole, via a magnetic gap at a time. The number of the removed stator magnetic poles, as stated above, is at least one, and preferably 2 to 5. The ends opposite from the magnetic poles of the stator magnetic pole teeth having the stator magnetic poles provided at substantially equal angular intervals preferably are connected to each other by a back yoke made of soft magnetic material.

At least a part of an output/input terminal of the diskette and/or a card contact terminal are provided at a position where the removed stator magnetic pole teeth would be, that is, radially outside the soft magnetic piece. In the case, it is preferable that the back yoke that would connect the removed stator magnetic pole tooth or teeth to other teeth is cut off at the position.

The circumferential width of the soft magnetic piece the stator has instead of the magnetic poles preferably is not less than the angular interval of the rotor magnetic poles, that is, not less than the angular distance between the mid-portions at both sides of the rotor magnetic poles.

The stator preferably has on each end of the magnetic pole teeth on a stator inner circumferential surface stator magnetic poles that can face the rotor magnetic poles except for at least two successive rotor magnetic poles via a magnetic gap at a time. In the case, the soft magnetic piece can face the at least two successive rotor magnetic poles. The circumferential width of the soft magnetic piece is desirably not less than twice the angular interval of the rotor magnetic poles.

The soft magnetic piece preferably has a longitudinal groove in the axial direction on the surface facing the rotor magnetic poles. The axial groove has a width of 0.1 to 0.4 of the circumferential width of the rotor magnetic poles in which the pole width of the rotor permanent magnet is represented as $2\pi$ (360 degrees)/n (n: pole number).

According to the invention, the permanent magnet generator can be improved in cogging torque. The cogging torque can be reduced to less than 2.5 mNm that is a driving torque of 3.5" FDD, so the generator can be used in 3.5" FD.

BRIEF DESCRIPTION OF THE DRAWINGS

FIG. 1 shows a diskette incorporating a permanent magnet generator of one embodiment according to this invention;

DETAILED DESCRIPTION OF THE PREFERRED EMBODIMENTS

In the following, a permanent magnet generator and a diskette incorporating it according to the present invention will be described, referring to the accompanying drawings.

Figure 1A:
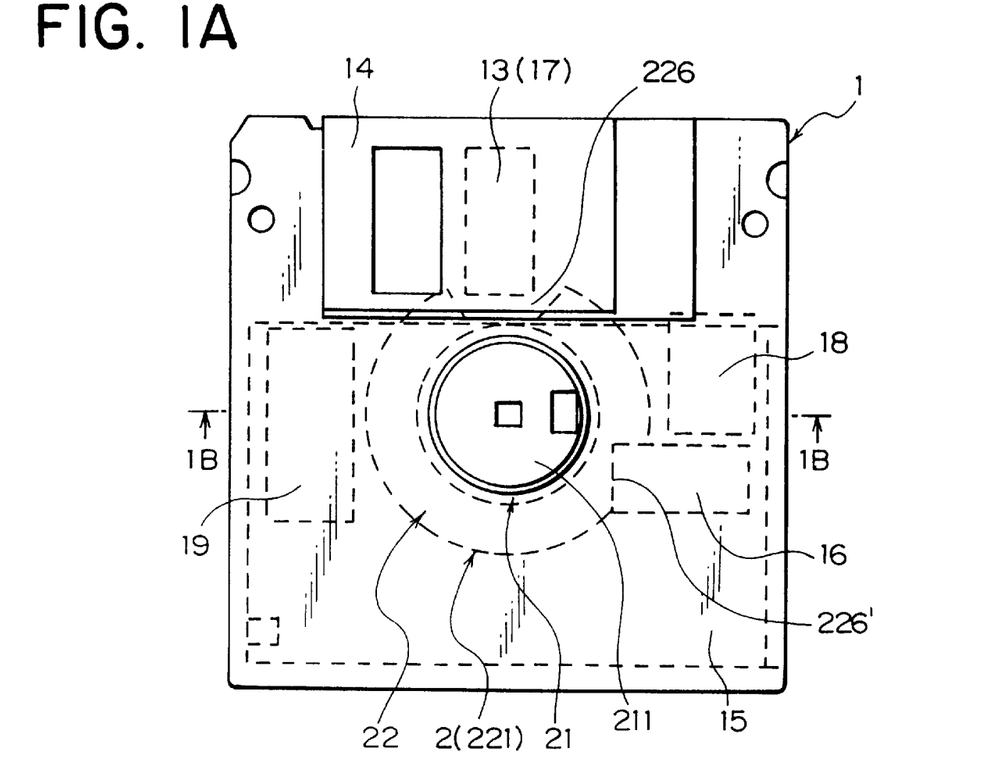
FIG. 1A being a plane (bottom) view of the diskette.
Figure 1B:
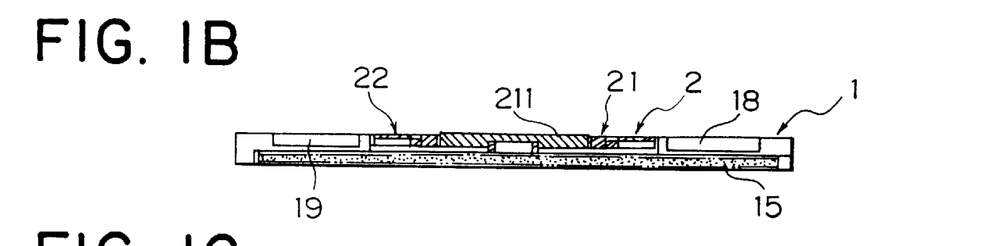
FIG. 1B a cross-sectional view taken along line 1B—1B in FIG. 1.
Figure 1C:
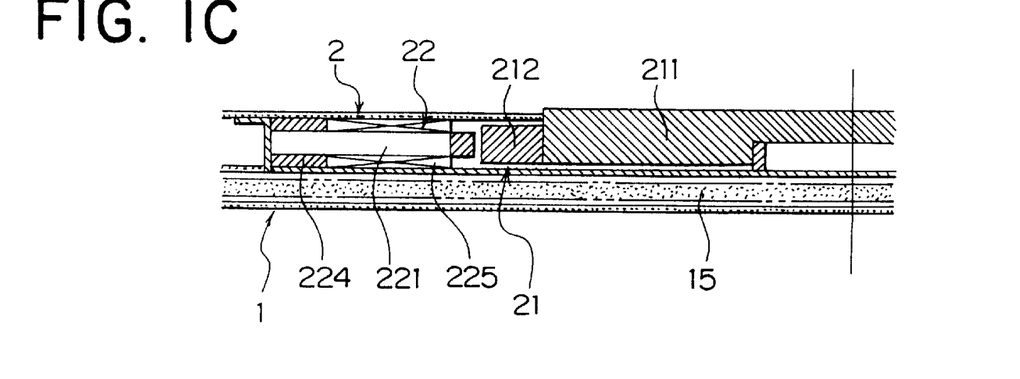
FIG. 1C a partially enlarged view of FIG. 1B.
Figure 2:
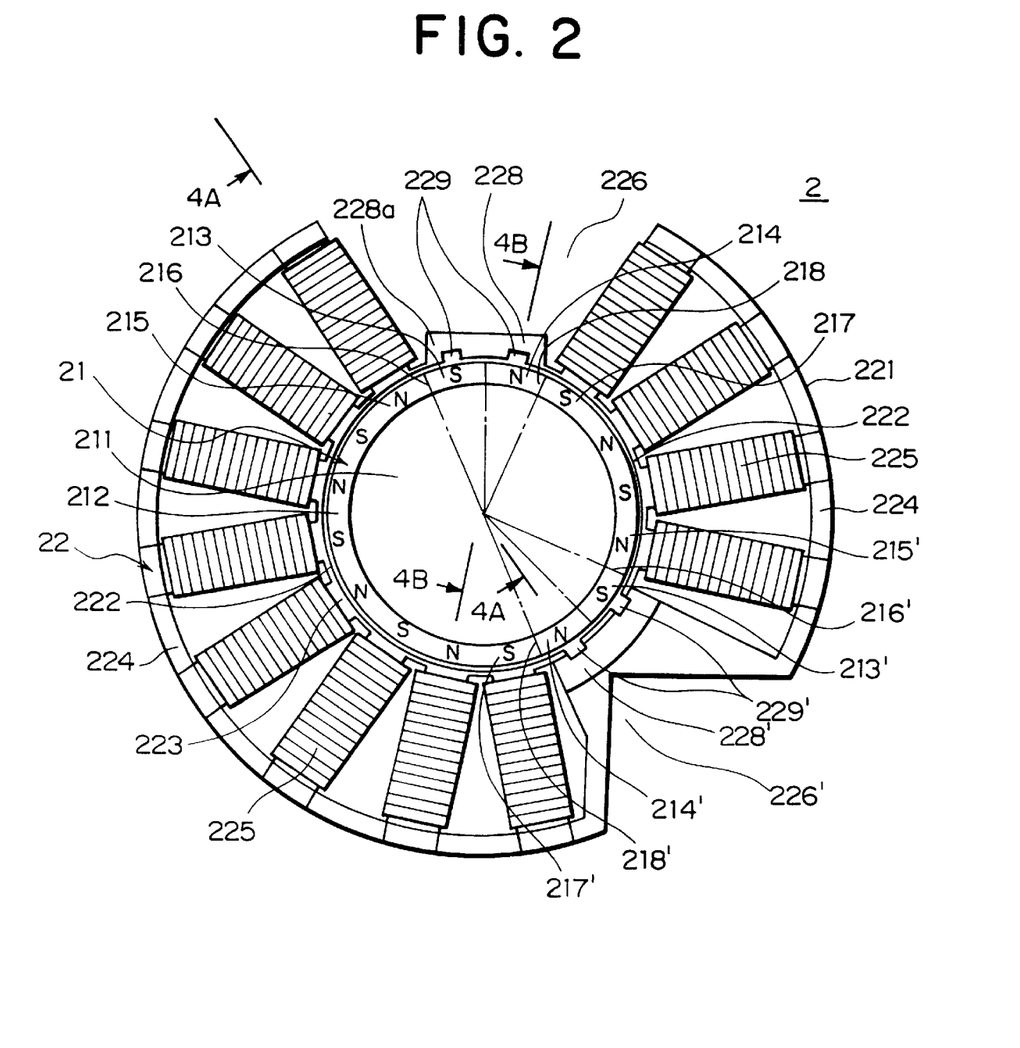
FIG. 2 is a plane view of the permanent magnet generator according to this invention incorporated in the diskette of FIG. 1.

A diskette incorporating a permanent magnet generator of one embodiment according to this invention is shown in FIG. 1 in which FIG. 1A is a plane (bottom) view of the diskette, FIG. 1B is a cross-sectional view taken along line 1B—1B in FIG. 1A and FIG. 1C is a partially enlarged view of FIG. 1B. FIG. 2 is a plane view of the permanent magnet generator incorporated in the diskette of FIG. 1.

First, the construction of a permanent magnet generator and a diskette incorporating it according to the present invention will be described. Although the following description is focused on a diskette that can be loaded on a 3.5" floppy disk drive, the present invention can be applied to a diskette of other sizes and constructions, as is evident from the following description. A 3.5" diskette (what is normally called 3.5" floppy disk) 1 has such a construction as shown in a plan (bottom) view of FIG. 1, encased in a plastic case of 94 mm in length, 90 mm in width and 3.5 mm in thickness. On one end of the case provided is a head slot 13 through which an input/output magnetic head can contact the disk. On the front end of the case provided is a sliding cover 14 that covers the head slot and can be slid open by the floppy disk drive. A hub 211 for transmitting the rotation of the drive shaft of the floppy disk drive is provided almost in the middle of the case. A floppy disk would be fitted coaxially with the hub so that it could rotate together with the hub.

In the diskette 1 incorporating the permanent magnet generator according to the present invention, a permanent magnet generator 2 is fitted around the hub 211 in the middle of the diskette 1. A rotor 21 of the generator 2 is formed by a ring-shaped permanent magnet 212 that is fitted on the outer circumference of the hub 211 and can be rotated together with the hub 211. A stator 22 of the generator 2 is provided inside the diskette 1 on the outer circumference of the rotor permanent magnet 212 with a magnetic gap between the stator and the outer circumferential surface of the permanent magnet 212. The diskette shown in the figure, which is used as an input/output device for a card having magnetic stripes (hereinafter referred to as "memory card"), such as an IC card and magnetic card, has a space 15 for inserting a memory card and a card contact terminal 16 for exchange of information with the memory card. A input/output terminal 17 for exchange of information between the diskette and the magnetic head of the floppy disk drive is provided at the head slot 13 through which the magnetic head could accesses the disk. A CPU 18 for processing information between the input/output terminal 17 and the card contact terminal 16 is provided as necessary. The permanent magnet generator 2, which is used as a drive power for driving the CPU 18 and the card contact terminal 16, requires rectification and stabilization because electric power generated by the generator may sometimes contain ripples, etc. A stabilized power supply circuit 19 is therefore incorporated in an output line of the generator 2 provided in the diskette.

The rotor 21 of the permanent magnet generator 2 is caused to rotate as the drive shaft thereof is rotated by the hub 211 that is engaged with the drive shaft of the floppy disk drive. In the case of a 3.5" floppy disk drive, the revolution of the drive shaft is normally 300 rpm. As the hub 211 is engaged with the drive shaft of the floppy disk drive in this way, the construction of the portion at which the hub 211 is engaged with the drive shaft should preferably be the same as that of the hub of a normal diskette.

FIG. 1A shows in broken lines the relative locations of the permanent magnet generator 2, the input/output terminal 17 and the card contact terminal 16. If the outer circumference of the stator yoke of the permanent magnet generator 2 assumes a perfect circle, the outer circumference of the stator yoke 221 may interfere with the input/output terminal 17 or the card contact terminal 16. To cope with this, therefore, the outer circumference of the stator yoke 221 should preferably be notched to clear these terminals.

The size of the memory card is often the same as that of a normal credit card, that is, 85 mm in length, 54 mm in width and 0.8 mm in thickness. A space for accommodating this memory card provided in the diskette case 1 overlaps the permanent magnet generator 2 incorporated as shown in FIGS. 1A through 1C. Providing two (top and bottom) 0.2 mm-thick plastic case shells, and a 0.8 mm-thick memory card within a 3.5 mm-thick 3.5" diskette would leave a 2.3 mm thickness at most for the generator 2, giving some allowance for inserting and extracting the card. It follows from this that the size of the generator 2 is approx. 55 mm in outside diameter and 2 mm in thickness; the size of the rotor 21 is on the order of 30 mm in outside diameter, taking into account the hub diameter of 25 mm.

Figure 3:
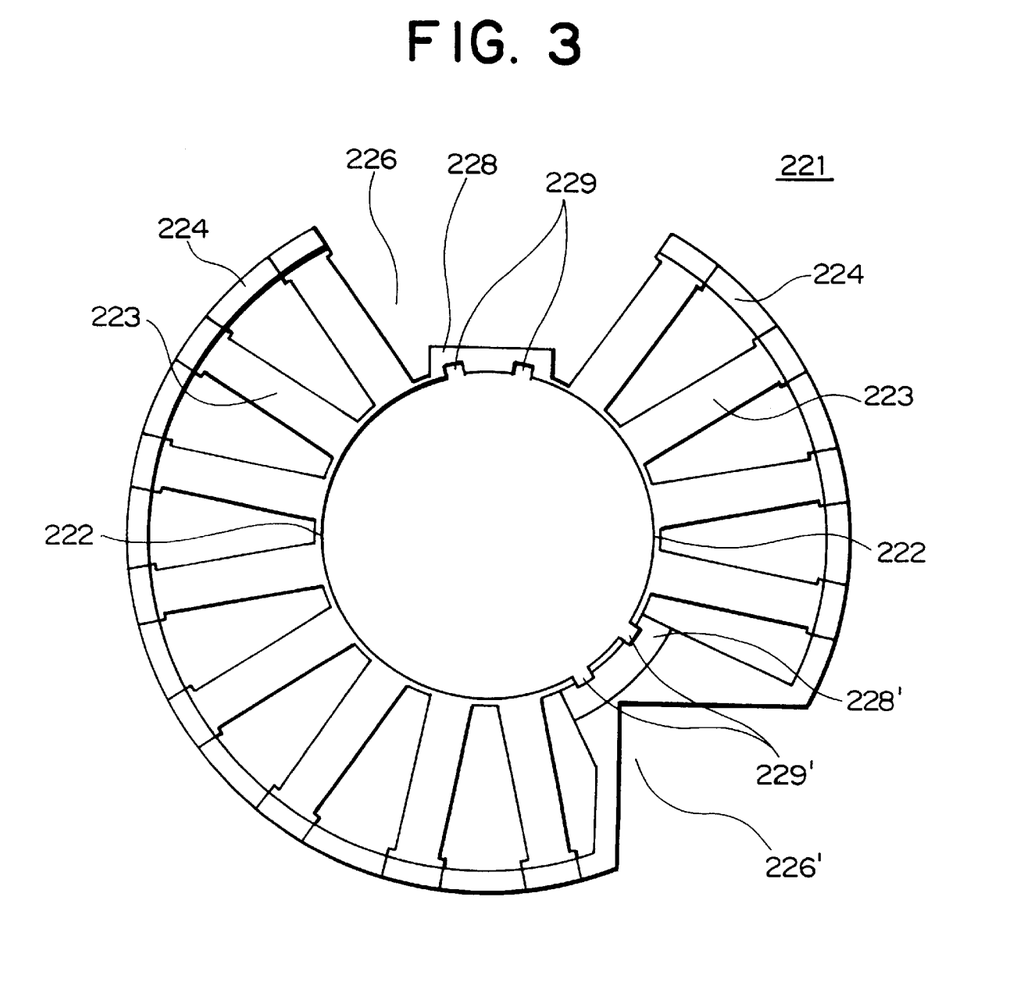
FIG. 3 is a plane view of a stator yoke used in the permanent magnet generator shown in FIG. 2.
Figure 4A:
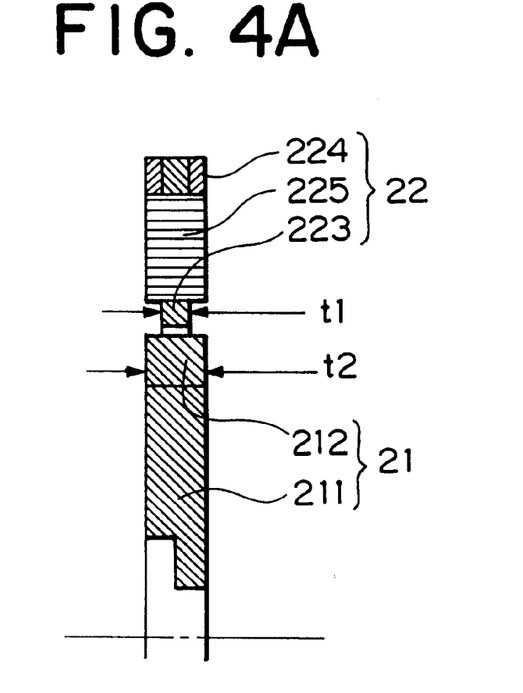
FIG. 4A is a cross-sectional view taken along line 4A—4A in FIG. 2.
Figure 4B:
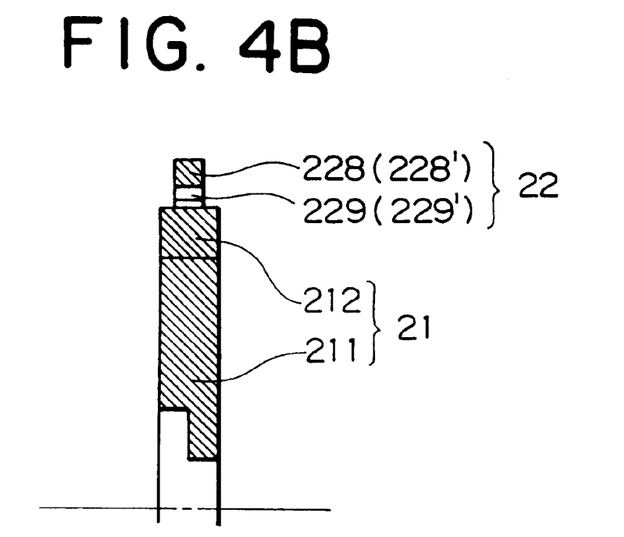
FIG. 4B a cross-sectional view taken along line 4B—4B in FIG. 2.

With reference to the drawings, FIG. 2 shows a plane view of the permanent magnet generator 2 according to this invention, FIG. 3 a plane view of the stator yoke 221 of the generator and FIG. 4A a cross-sectional view taken along line 4A—4A in FIG. 2 and FIG. 4B a cross-sectional view taken along line 4B—4B in FIG. 2. Numeral 21 denotes rotor where the ring-shaped permanent magnet 212 is fixedly fitted around the outer circumference of the hub 211. The permanent magnet 212 has a plurality of rotor magnetic poles at substantially equal angular intervals on the outer circumference thereof; the magnetic poles being arranged in alternately different polarities (i.e., NSNS - - - ) in the circumferential direction. The hub 211 of the rotor 21 is supported by, for example, an oil-impregnated bearing made of sintered copper alloy so that the hub 211 can rotate with respect to the shaft fixed on a generator housing (not shown).

A stator 22 having a plurality of stator magnetic poles disposed in such a manner as to face the outer circumference of a permanent magnet 212 via magnetic gaps of substantially the same size is provided. The stator magnetic poles are provided on one end of the magnetic pole teeth 223 made of soft magnetic material in such a manner as to face the outer circumference of the permanent magnet 212 at a time. The magnetic poles of the magnetic pole teeth 223 are disposed on the inner circumferential surface of the stator 22 in such a manner as to face the rotor magnetic poles, except for at least one, via magnetic gaps of substantially the same size at a time. That is, the stator magnetic poles are positioned with each other at substantially equal angular intervals. The magnetic pole teeth 223 having successively adjoining stator magnetic poles are connected to each other at the other ends by a back yoke 224. As shown in FIGS. 1 to 3, on each of the magnetic pole teeth 223 wound is a stator coil 225. The stator coils 225 are preferably connected in series to each other.

Each stator magnetic pole of the magnetic pole teeth 223 facing the rotor circumferential surface is preferably connected to the adjoining stator magnetic poles by an inner yoke 222. The construction in which the stator magnetic poles face the rotor magnetic poles at a time tends to increase cogging torque. Connecting the stator magnetic poles by an inner yoke 222 causes magnetic flux to leak between the magnetic poles, leading to reduced cogging torque. Increasing leakage flux between the magnetic poles in an attempt to reduce cogging torque, however, could reduce the effective flux passing in the magnetic pole teeth. To cope with this, the cross-sectional area of the inner yoke 222 between the stator magnetic poles is made smaller than the cross-sectional area of the stator magnetic pole teeth 223. When the width of the magnetic pole teeth is 3 mm, the thickness of the inner yoke is set to 0.5 mm to allow almost all magnetic flux coming out of the rotor magnetic poles to pass through the stator magnetic pole teeth.

When the stator magnetic poles are positioned facing the rotor magnetic poles at a time, at least one of the rotor magnetic poles has no stator magnetic poles to face. On the stator inner circumferential surface facing the rotor magnetic poles having no matching stator magnetic poles provided are soft magnetic pieces 228 and 228' made of soft magnetic material. The soft magnetic piece 228 covers from one side of the rotor magnetic pole to the other side and its width is not less than the width of the rotor magnetic pole. In other words, the width of the soft magnetic piece 228 is equal to or more than the interval of the rotor magnetic poles. The soft magnetic pieces 228 and 228' shown in FIGS. 2 and 3 magnetically connect two successive rotor magnetic poles 213 and 214 (213' and 214'). The radial lengths of the soft magnetic pieces are shorter than the ordinary magnetic pole teeth 223, as shown in FIG. 4. In FIG. 2, the rotor magnetic poles S 213 and N 214 on the upper part do not face any stator magnetic poles. The left end 228a of the soft magnetic piece 228 is located at the mid-portion 216 between the S pole 213 and the N pole 215 at the left of the pole 213, from which the soft magnetic piece 228 extends rightward to the mid-portion 218 between the N magnetic pole 214 on the upper part, which does not face any stator magnetic pole, and the S pole 217 at the right of the pole 214. That is, the soft magnetic piece 228 faces the two successive rotor magnetic poles. Grooves 229 are provided in the axial direction on the surface of the soft magnetic piece 228 facing the S and N poles of the rotor.

The rotor magnetic poles S 213' and N 214' at the lower right of the figure do not face any stator magnetic poles, and a soft magnetic piece 228' is provided instead of stator magnetic poles. This soft magnetic piece 228' extends from the mid-portion 216' between the S pole 213' and the N pole 215' at the upper right of the pole 213' to the mid-portion 218' between the N pole 214', which does not face any stator magnetic pole, and S pole 217' at the lower left of the pole 214'. That is, the soft magnetic piece 228' faces the two successive rotor magnetic poles. Grooves 229' are provided in the axial direction on the surface of the soft magnetic piece 228' facing the S pole 213' and the N pole 214' of the rotor.

The soft magnetic pieces 228 and 228' magnetically connecting the rotor magnetic poles are positioned on the stator inner circumferential surface facing those rotor magnetic poles having no matching stator magnetic poles when the rotor magnetic poles fall on the locations at which they should face the stator magnetic poles. Moreover, grooves (extending in the axial direction) 229 and 229' are provided on the soft magnetic pieces 228 and 228' at the locations facing the rotor magnetic poles. Thus, when the rotor magnetic poles are at locations shifting from the stator magnetic poles that should face the rotor magnetic poles, the soft magnetic pieces magnetically short-circuit the rotor magnetic poles. At this time the soft magnetic pieces attract the rotor magnetic poles facing the ends of the soft magnetic pieces. When the rotor magnetic poles fall on the locations at which they should face the stator magnetic poles, on the other hand, the axially extending grooves provided on the soft magnetic pieces face the rotor magnetic poles, making the standstill of the rotor magnetic poles at those locations unstable, causing the rotor to move in the direction of the ends of the soft magnetic pieces.

The rotor magnetic poles facing the stator magnetic poles act to cause the rotor to stop at the position at which they face the stator magnetic poles, while the rotor magnetic poles facing the grooves on the soft magnetic pieces act to cause the rotor to move from that position. Thus, the cogging torque of the rotor is reduced.

In the foregoing description, it is stated that the soft magnetic pieces 228 and 228' "connect the mid-portion between the magnetic poles on both sides of the rotor magnetic pole." The expression "the mid-portion between the magnetic poles" does not necessarily mean the central point between magnetic poles of different polarities when multiple magnetic poles are arranged on the outer circumferential surface of a cylindrical permanent magnet, but refers to peripheral parts excluding the center of the magnetic pole. When one rotor magnetic pole faces a stator magnetic pole, while the other rotor magnetic pole face a groove provided on a soft magnetic piece, attraction force at the position of the other rotor magnetic pole is reduced, and as a result, the rotor magnetic pole is attracted to the soft magnetic piece on the side of the groove to produce a turning moment. Thus, the end of the soft magnetic pole may be shifted from the rotor magnetic pole to such an extent that the turning moment is generated.

As the output of the generator is generated by the stator coils wound on the stator magnetic pole teeth provided in such a manner as to face the rotor magnetic poles, if the number of rotor magnetic poles is 16 poles and one of them does not face a stator magnetic pole, the magnetic force of the rotor permanent magnet is reduced by $\frac{1}{16}$. This loss of magnetic force can be compensated by increasing the number of coil turns. As described above, soft magnetic pieces are provided in place of the stator magnetic poles at locations which they should face rotor magnetic poles. The number of removed stator magnetic poles should preferably be at least one pole, or more preferably be not less than two poles in a row. The total number of the removed stator magnetic poles is preferably less than 7, more preferably less than 6. The width of the grooves provided on the soft magnetic pieces should preferably be 0.1 to 0.4 of the width of the magnetic poles of the rotor permanent magnet. The width of the magnetic poles of the rotor permanent magnet is obtained as $2\pi$ (360 degrees)/n (n: no. of rotor poles). The depth of the grooves may be more than the magnetic gap between the rotor and the stator.

Figure 5:
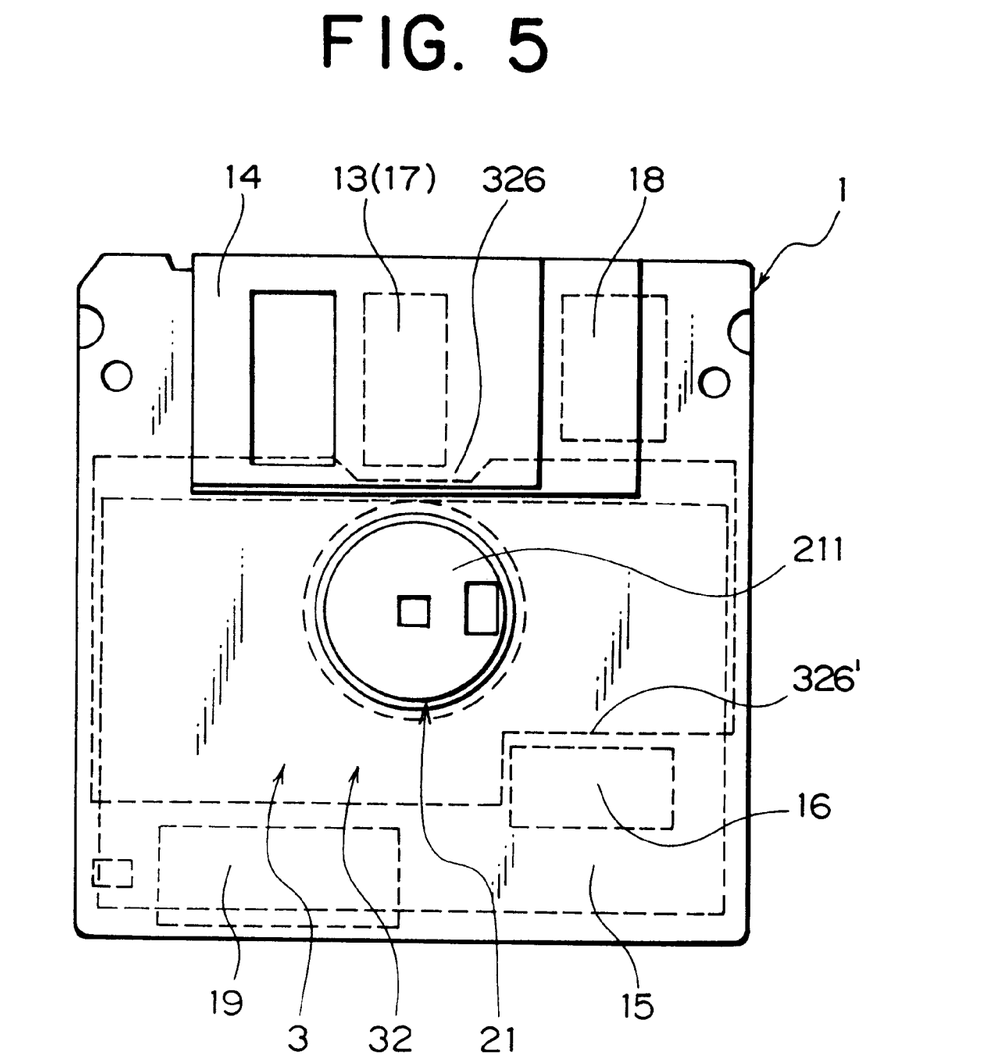
FIG. 5 is a plane (bottom) view of a diskette incorporating a permanent magnet generator of another embodiment according to this invention.

FIG. 5 shows a plane (bottom) view of another embodiment of a diskette incorporating a permanent magnet generator. The generator 3 has a little different shape from the generator 2 of FIG. 1. Accordingly, the card contact terminal 16, the CPU 18 and the stabilized power supply circuit 19 are disposed at a little different positions. In the figure, like parts are indicated by like numerals used in FIG. 1, except for reference numerals for parts of a permanent magnet generator 3 and its stator 32.

Figure 6:
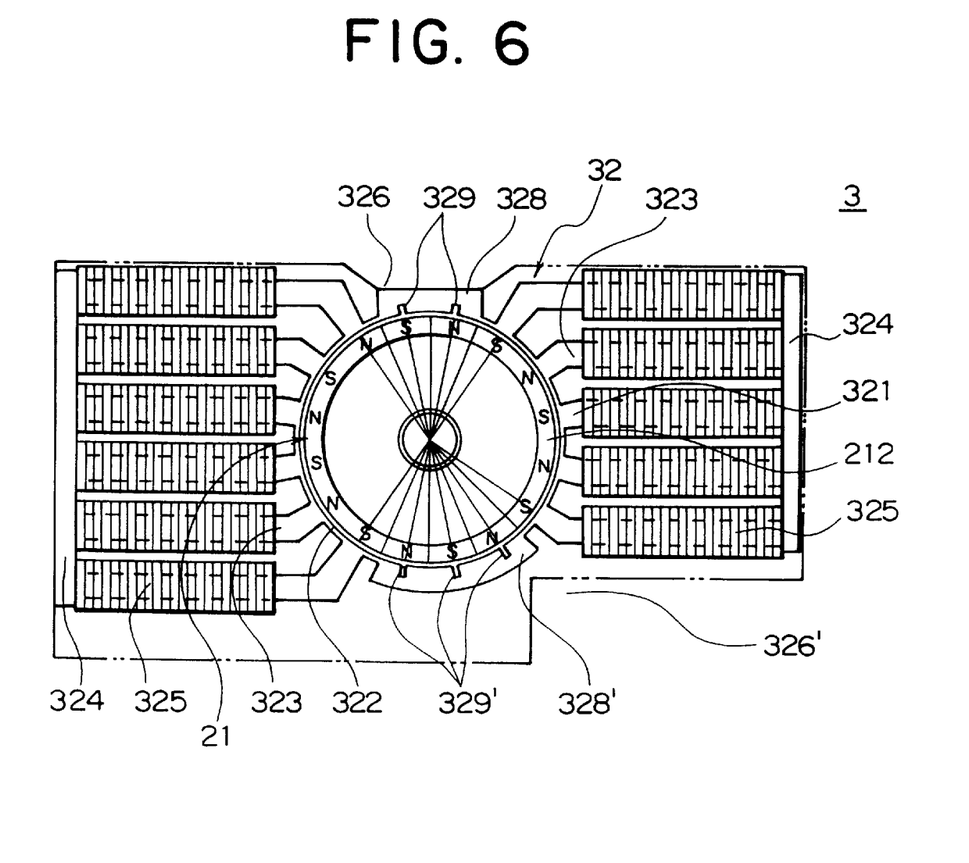
FIG. 6 is a plane view of the permanent magnet generator according to this invention used in the diskette shown in FIG. 5.

The permanent magnet generator 3 in FIG. 5 has a stator yoke 321 surrounding around the rotor 21 via a magnetic gap, referring to a plane view of the permanent magnet generator shown in FIG. 6. The explanation about the construction of the rotor 21 is omitted here, since the rotor is the same as in FIG. 1. The stator yoke 321 has magnetic pole teeth 323 almost parallel to each other and each of the magnetic pole teeth 323 has a rotor magnetic pole on one end facing the stator permanent magnet 212. The stator magnetic poles are disposed at substantially equal angular intervals on the stator inner circumferential surface in such a manner as to enable to face the rotor magnetic poles at a time. FIG. 6 indicates that the magnetic pole teeth 323 are divided into two blocks; i.e., the left-hand block and the right-hand block. The magnetic pole teeth 323 in each block are connected, at ends opposite to the stator magnetic poles, to each other by a back yoke 324 and are wound by a coil 325, supplying an output.

The stator yoke has no stator magnetic pole teeth at the upper and the lower portions of the rotor in the figure, between the left-hand and the right-hand blocks. When the rotor comes to stop with its magnetic poles facing the stator magnetic poles, the two magnetic poles at the upper portion do not face the stator magnetic poles. On the stator inner circumferential surface facing the rotor magnetic poles without a counterpart stator magnetic pole, there is disposed a soft magnetic piece 328 which faces two successive rotor magnetic poles. Also, three rotor magnetic poles at the lower portion of the rotor in the figure do not face stator magnetic poles at the same time. On the stator inner cicumferential surface facing the three rotor magnetic poles without a counterpart stator magnetic pole, there is another soft magnetic piece 328' instead of stator magnetic poles. The soft magnetic piece 328' faces the three successive rotor magnetic pole. On the surfaces of the soft magnetic pieces 328, 328', grooves 329, 329' are provided in the axial direction at the position facing the rotor magnetic poles. The soft magnetic pieces with a cicumferential width of twice or more of angular intervals of rotor magnetic poles are provided to result in reduction of a cogging torque of the rotor against the stator. Providing a groove facing a rotor magnetic pole on the soft magnetic piece can further reduce the cogging torque of the rotor.

The soft magnetic pieces 228, 228', 328, 328' are provided at the positions where the notches 226, 226', 326, 326' are disposed on the generator stators 22, 32. Where an input/output terminal 17 or a card contact terminal 16 is provided as in the case of the diskette 1 shown in FIGS. 1A and 5, these notches are provided with the stators to prevent interference between these terminals and the stator yokes 221, 321. A notch of this type, also, may be provided to avoid interference with the space the space for inserting a memory card. When these notches 226, 226', 326, 326' are provided on the stator yoke 221, 321, the number of the magnetic pole teeth 223, 323 of the stator 22, 32 is reduced because those magnetic pole teeth that would otherwise be provided have been replaced by the notches. The remaining magnetic pole teeth 223, 323 are disposed at substantially equal intervals so as to face the magnetic poles of the rotor permanent magnet 212. The number of the stator magnetic pole teeth 223, 323 replaced by notches, if any, would be at least one, or normally two to five poles.

The magnetic pole teeth 223, 323, the inner yoke 222, 323 and the back yoke 224, 324 of the stators 22, 32 are all made of soft magnetic material. Since high saturation magnetic flux density Bs is desirable in reducing the cross-sectional area of parts to reduce the entire generator, soft magnetic material having a saturation magnetic flux density Bs of more than 1.2 T such as soft iron, electromagnetic soft iron, dust iron core and silicon steel containing 4 to 6% Si can be used. Stator coils 225, 325 for generating output are wound on each magnetic pole tooth 223, 323. The generators 2, 3 are of a flat disk shape as a whole, the thickness of which must be not more than 2 mm at the thickest. It is therefore necessary to reduce the outermost diameter of the stator coil 225, 325 wound on the magnetic pole tooth 223, 323, that is, the thickness in the axial direction, to not more than 2 mm.

A ring-shaped permanent magnet is desirable as a permanent magnet 212 used in the rotor 21, as noted earlier. This permanent magnet 212 is fixedly fitted to the outer circumference of the hub 211 by adhesive, for example. This ring-shaped permanent magnet has an appropriate length in the axial length, that is, an appropriate thickness. The thickness of the permanent magnet is 2.0 mm at the maximum, the practically usable range is 0.8 to 2.0 mm, and the preferable thickness range is 1.0 to 1.8 mm. Apparently this size can vary depending on the size of diskette used, or the configuration of equipment to be incorporated together with the magnet.

The thickness in the magnetizing direction of the ring-shaped permanent magnet 212 is desired to be as thick as possible in terms of magnetomotive force. With a permanent magnet having a radially easy magnetization axis, or a radial anisotropy, the use of a hub 211 made of ferromagnetic material can cause the magnetic lines entering in the radial direction of the magnet from the adjoining magnetic poles on the circumferential surface to connect in the hub made of ferromagnetic material to the magnetic lines entering in the radial direction from the magnetic poles of the opposite polarity. With a permanent magnet having a polar anisotropy, the magnetic poles of the opposite polarity are connected to each other within the magnet by magnetic lines. In both cases, the radial thickness of the permanent magnet 212 may be thicker than $1/3 \sim 1/4$ of the distance between the magnetic poles, and should more preferably be more than 2 mm.

The material of the permanent magnet 212 should preferably be a sintered NdFeB magnet. Since the permanent magnet used in the present invention has a large demagnetizing factor due to its shape and a large inverse magnetic field is applied to the magnet, despite its relatively thin thickness (that is, relatively thin thickness in the magnetizing direction), a magnet having a large coercive force and a large magnetic flux density like a NdFeB magnet is therefore desirable. Since sintered NdFeB magnets normally have a magnetic anisotropy, the magnet used in the present invention should preferably be a magnet having the axis of easy magnetization in the radial direction, or a radial anisotropy, and a magnet having the axis of easy magnetization in the direction in which the adjoining magnetic poles of different polarities on the circumferential surface are connected, or a polar anisotropy. A bonded NdFeB magnet made by binding NdFeB magnet powder with plastic binder can also be used, but a bonded magnet generates less magnetic flux because it has a smaller magnet content compared with a sintered NdFeB magnet. Where only a small output is required, a permanent magnet generator made with a bonded magnet may suffice for the purpose.

Instead of NdFeB magnets, (1) nitride magnets, such as SmFeN magnets, (2) magnets containing SmFeN and α iron, often referred to as exchange spring magnets, and magnets containing NdFeB and α iron, magnets containing NdFeB and $Fe_3B$, etc., (3) NdFeB, SmFeN and other HDDR (hydrogenation, decomposition, dehydration and recombination) magnets, and (4) SmCo magnets can be used, depending on required properties.

Although the figures show a ring-shaped permanent magnet 212 having 16 magnetic poles on the outer circumferential surface, the number of magnetic poles in the present invention should preferably be 12 to 24 poles, and more preferably 16 to 20 poles. With decreases in the number of magnetic poles, the amount of flux per pole increases, but a generator having a permanent magnet having 16 to 24 poles generates the highest output. With increases in the number of magnetic poles, on the other hand, the space between the stator magnetic pole teeth extending outward becomes smaller, and the number of coil urns on the magnetic pole teeth is also reduced. Moreover, the manufacture of the stator becomes more difficult, and distortions are caused in the output voltage waveform. Thus, the most desirable number of magnetic poles is 16 to 20.

The thickness of the magnetic poles of the outwardly extending stator magnetic pole teeth 223, 323 must be smaller than the axial length, that is, the thickness of the permanent magnet 212. That is, if the stator magnetic pole teeth are thicker than or equal to the axial length of the rotor, the stator would be thicker by the thickness of the stator windings than the rotor. As in the generator of this invention strictly restricted in the axial length, it is important that the total thickness of the stator magnetic poles and the windings on them is limited within the axial thickness of the rotor, to improve the space utilization in the limited axial length. To accomplish the high space utilization, it is useful to make the stator teeth thinner than the rotor and to maintain the total thickness of the stator including the windings almost equal to the axial length of the rotor. By making the thickness of the stator magnetic pole teeth 223, 323 smaller than the thickness of the permanent magnet, a larger output can be generated by the generator 2, 3. The thickness of magnetic poles of the stator magnetic pole teeth 223, 323, however, must have a thickness enough not to be saturated by magnetic flux generated by the permanent magnet 212. FIG. 4A shows cross-sectional relationship of the stator 22 and the rotor 21 of the permanent magnet generator 2 according to the present invention, showing the thickness t1 of the outwardly extending stator magnetic pole teeth and the thickness t2 of the magnet. In the figure, t1 must be smaller than t2 (t1<t2). This is to introduce as much magnetic flux as possible into the outwardly extending magnetic pole teeth 223 constituting the stator 22 by concentrating the magnetic flux exerting from magnetic poles of the permanent magnet 212, and increase the magnetic flux density in the magnetic pole teeth. When comparing the magnetic flux density of the permanent magnet 212 with the saturation magnetic flux density of the stator magnetic pole teeth 223, the saturation magnetic flux density of a stator magnetic pole teeth 223 made of soft magnetic material is more than 1.2 T, while even a permanent magnet 212 made of a sintered NdFeB magnet having the strongest magnetic force has a magnetic flux density of about 1.0T at the working point because its residual magnetic flux density is 1.2 to 1.3T. When a sintered NdFeB magnet is used as the rotor permanent magnet and a stator 22 having a saturation magnetic flux density of more than 1.2T is used, the thickness of the magnetic pole teeth 223, 323 should preferably be 30 to 70% of the thickness of the permanent magnet.

Experiment

The permanent magnet generator according to this invention will be described in detail, referring to the experiment shown below, together with requirements for implementing the invention.

In the permanent magnet generator as shown in FIG. 2 manufactured based on the design specifications of TABLE 1, the groove width (with 1.5 mm depth) on the soft magnetic pieces of 45 degree width were changed from 0 mm (no groove) to 2.2 mm and cogging torques and output voltages were measured. The results are shown in TABLE 2.

As apparent from TABLE 2, the cogging torque was able to be reduced by providing the soft magnetic piece and further reduced with the grooves of 3.1 to 8.6 degree width on the soft magnetic piece. Since the rotor pole width is 22.5 degrees/pole as calculated from 360 degrees/16 poles, it is apparent that the groove width of 0.14 to 0.4 of the pole width is useful to reduce the cogging torque. At the time, the output voltage was maintained to be 4.2 V.

TABLE 1

| Item | Specification |
| --- | --- |
| Size of stator yoke | Outside dia. 77 mm × inside dia. 29.4 mm × thick. 0.8 mm |
| Size of rotor | Outside dia. 29.0 mm × inside dia. 25 mm (hub dia.) × thick. 2.0 mm |
| Permanent magnet | Sintered NdFeB radial anisotropic permanent magnet (Br: 1.24 T, bHc: 9.3 × $10^{-2}$ kA/m) |
| No. of rotor poles | 16 poles |
| Stator material | Cold-rolled steel sheet SPCC (Saturation flux density Bs: 1.5 T) |
| No. of stator poles | 16 poles (12 poles as four poles replaced with soft magnetic pieces) |
| Stator winding | No. of turns: 600 turns/poles Wire dia.: 0.16 mm Coil resistance: 71 ohms (for 12 poles) Series connection |
| Inner yoke of stator | Thick. of enclosed-slot bridging part: 0.5 mm Width of magnetic pole teeth: 3.5 mm Thick. of magnetic pole teeth: 0.8 mm Angle of tapers: 180 degrees |
| Magnetic gap | 0.2 mm (on one side) |
| Revolution | 300 rpm |

TABLE 2

| Groove width (mm) | Groove width (angle degrees) | Cogging torque (0-peak)(mNm) | Output ($V_{O-P}$) |
| --- | --- | --- | --- |
| 0 | 0 | 6.69 | 4.2 |
| 0.8 | 3.1 | 4.37 | 4.2 |
| 1.4 | 5.5 | 2.52 | 4.2 |
| 1.8 | 7.0 | 1.81 | 4.2 |
| 2.2 | 8.6 | 2.68 | 4.2 |
| Comparison example | No soft magnetic piece | 12.55 | 4.2 |

As described in detail above, the invention provides a permanent magnet generator, having a flat shape as a whole and with a reduced cogging torque, that can be incorporated in a 3.5" diskette. The generator is provided with notches that would otherwise interfere with an input/output terminal or card contact terminal when it is incorporated in the diskette and is reduced in cogging torque by providing a soft magnetic piece at the notches.

What is claimed is:

1. A diskette comprising:
   a diskette case;
   a hub rotatable mounted in the diskette case; and
   a permanent magnet generator provided in the diskette case, for converting mechanical energy into electrical energy while the hub is being positively driven to rotate, the permanent magnet generator having
   (1) a a ring-shaped permanent magnet provided on the hub and rotatable with the hub, the permanent magnet having a circumferential surface on which a plurality of rotor magnetic poles are arranged, the rotor magnetic poles having alternately different polarities in a circumferential direction, and
   (2) a stator mounted in the diskette case and extending around the permanent magnet, the stator having a plurality of magnetic pole teeth made of soft magnetic material, the magnetic pole teeth
   (I) having radially inner ends on which stator magnetic poles are respectively provided, the stator magnetic poles facing the rotor magnetic poles via a magnetic gap,
   (II) extending radially outward from the stator magnetic poles and having respective stator coils wound thereon, and
   (III) having radially outer ends that are connected together by a back yoke made of soft magnetic material, the stator having at least one soft magnetic piece positioned between adjacent magnetic pole teeth, the soft magnetic piece having a circumferential width that is equal to or greater than a circumferential width of one of the rotor magnetic poles, wherein an axial thickness of the stator magnetic poles is smaller than an axial thickness of the permanent magnet.

2. The diskette as set forth in claim 1, wherein only 12 to 24 rotor magnetic poles are disposed at substantially equal angular intervals on the circumferential surface of the permanent magnet.

3. A permanent magnet generator incorporated in a diskette case in which a hub is rotatable mounted, the permanent magnet generator comprising:

(1) a ring-shaped permanent magnet provided on the hub and rotatable with the hub, the permanent magnet having a circumferential surface on which a plurality of rotor magnetic poles are arranged, the rotor magnetic poles having alternately different polarities in a circumferential direction; and (2) a stator extending around the permanent magnet, the stator having a plurality of magnetic pole teeth made of soft magnetic material, the magnetic pole teeth (I) having radially inner ends on which stator magnetic poles are respectively provided, the stator magnetic poles facing the rotor magnetic poles via a magnetic gap, (II) extending radially outward from the stator magnetic poles and having respective stator coils wound thereon, and (III) having radially outer ends that are connected together by a back yoke made of soft magnetic material, the stator having at least one soft magnetic piece positioned between adjacent magnetic pole teeth, the soft magnetic piece having a circumferential width that is equal to or greater than a circumferential width of one of the rotor magnetic poles, wherein an axial thickness of the stator magnetic poles is smaller than an axial thickness of the permanent magnet, and wherein the permanent magnet generator converts mechanical energy into electrical energy while the hub is being positively driven to rotate.

4. The permanent magnet generator as set forth in claim 3, wherein only 12 to 24 rotor magnetic poles are disposed at substantially equal angular intervals on the circumferential surface of the permanent magnet.

* * * * *